Oct. 13, 1970     H. BERGER     3,533,753
CATALYST FOR ENGINE EXHAUST-GAS REFORMATION
Filed Oct. 31, 1966     4 Sheets-Sheet 1
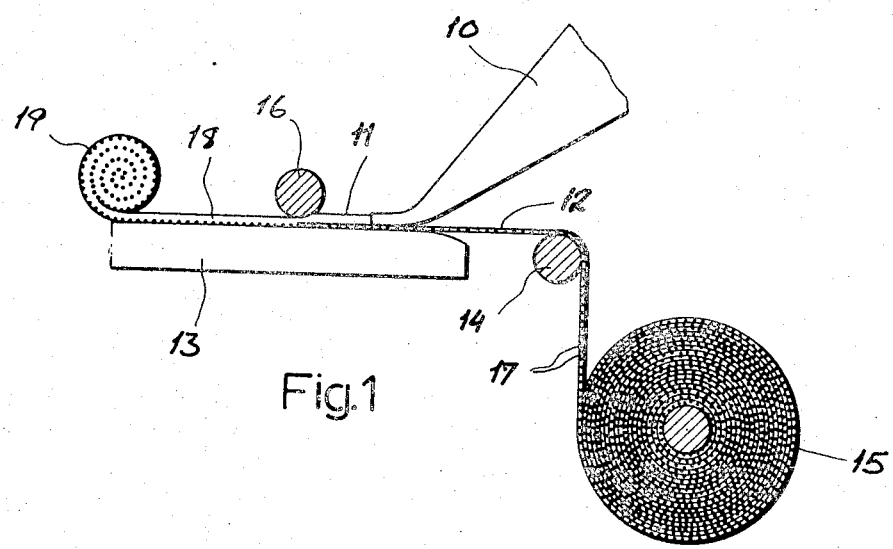
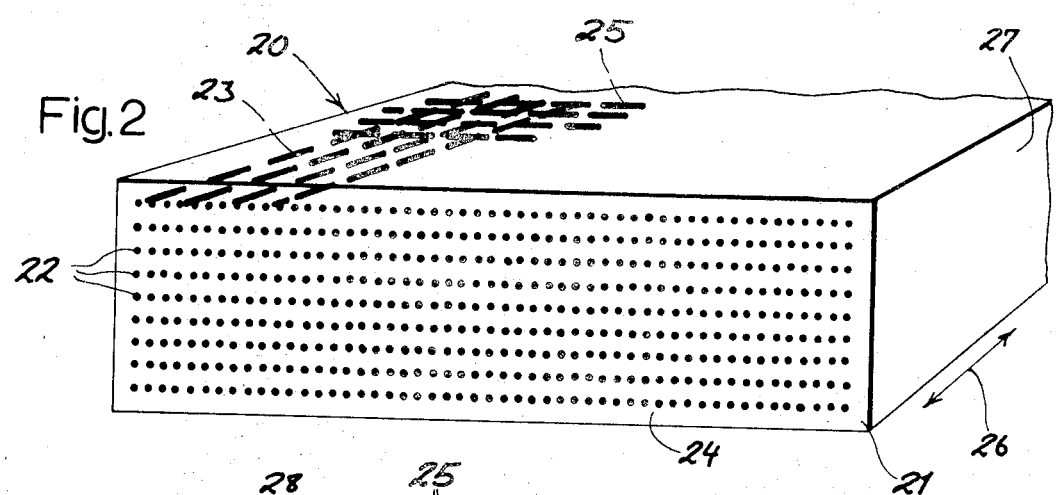
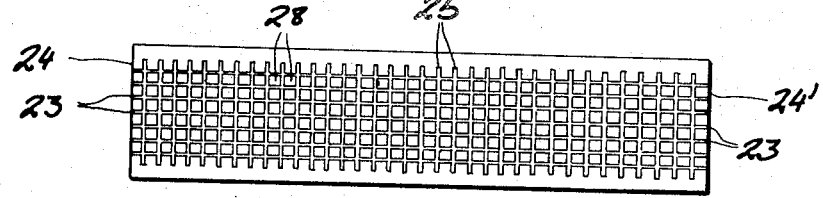
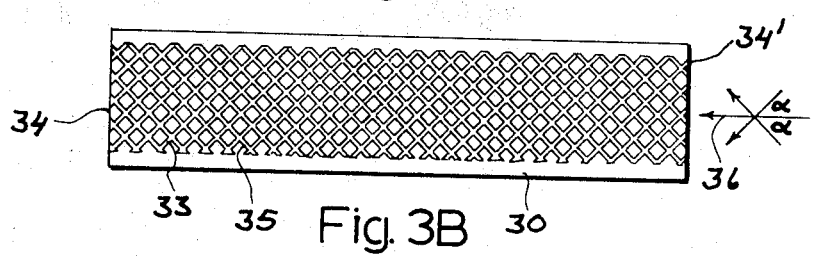
Heinz Berger
INVENTOR.
BY Karl F. Ross
Attorney Oct. 13, 1970     H. BERGER     3,533,753

CATALYST FOR ENGINE EXHAUST-GAS REFORMATION

Filed Oct. 31, 1966     4 Sheets-Sheet 2

*Heinz Berger*
INVENTOR.

BY

*Karl F. Ross*
Attorney

Oct. 13, 1970      H. BERGER      3,533,753
CATALYST FOR ENGINE EXHAUST-GAS REFORMATION
Filed Oct. 31, 1966      4 Sheets-Sheet 4
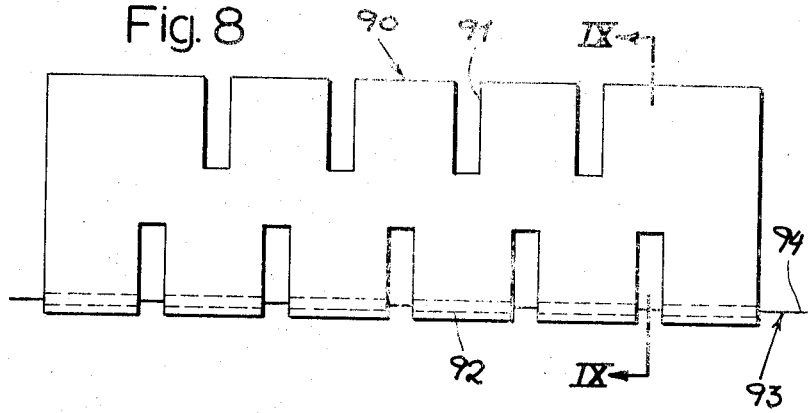
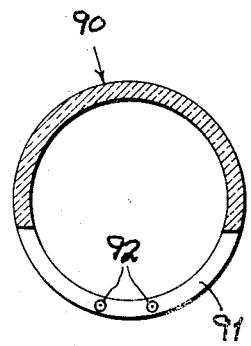
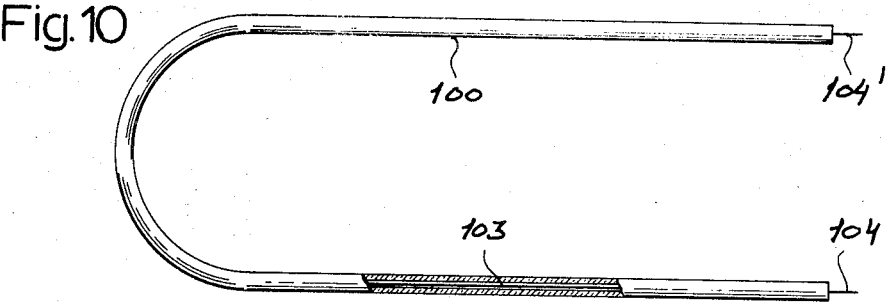
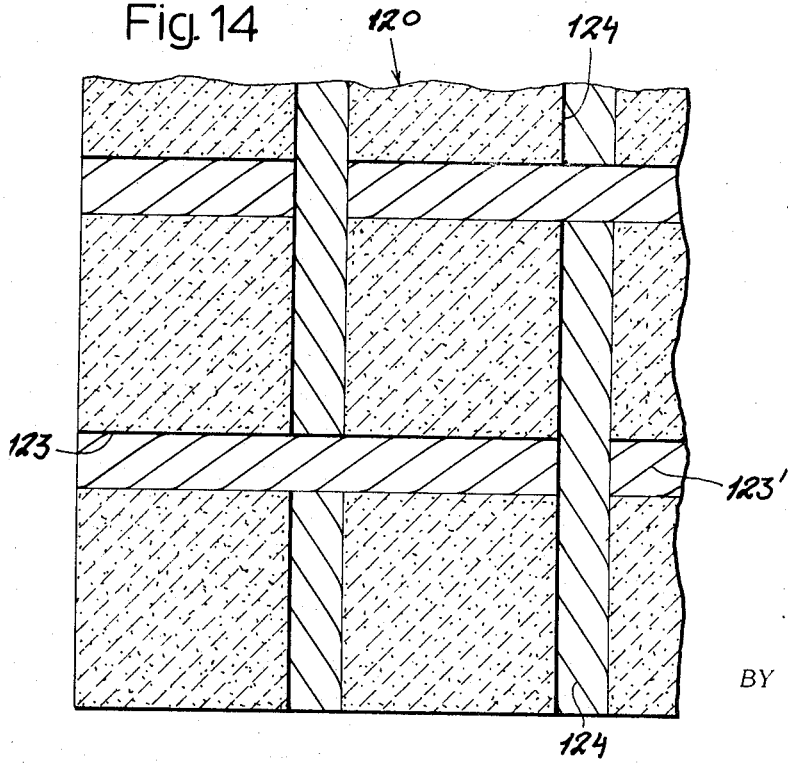
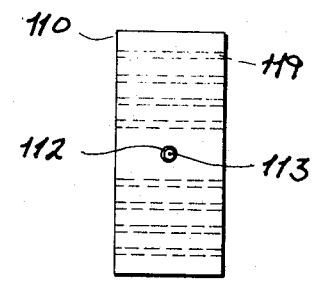
Heinz Berger
INVENTOR.
BY
Karl F. Ross
Attorney

United States Patent Office 3,533,753
Patented Oct. 13, 1970

1

3,533,753
CATALYST FOR ENGINE EXHAUST-GAS REFORMATION
Heinz Berger, Triftweg 2, Hoxter,
Westphalia, Germany
Filed Oct. 31, 1966, Ser. No. 590,930
Claims priority, application Germany, Oct. 29, 1965,
B 84,291
Int. Cl. B01j 9/04
U.S. Cl. 23—288  16 Claims

ABSTRACT OF THE DISCLOSURE

Catalyst body for the oxidation of the exhaust gas of an automotive internal combustion engine and a method of making a catalyst body whereby a ceramic mass, in which is embedded a thermally destructible fabric, is shaped into the desired catalyst configuration and fired to harden the ceramic material and destroy the fabric to produce a fabric-like network of catalyst channels therein. The ceramic mass is mixed with a catalyst substance prior to firing or the catalyst substance is impregnated into the fabric so that, upon destruction of the fabric, a catalyst residue remains in the channels. An electric heating element can be embedded in the body while a surface thereof can be formed with a multiplicity of combustion-initiating lands.

---

My present invention relates to a method of making a catalyst body and to the catalyst body thus made for use in the catalytic reformation (e.g. oxidation) of waste gases and, especially, the exhaust gases of internal-combustion engines.

Afterburner and catalyzed reformation systems for treating the exhaust gases of internal combustion engines have been proposed heretofore. The catalysts in such systems can be introduced directly or indirectly into the exhaust lines of the engine and may receive a throughflow of the exhaust gases directly upon their emergence from the engine block. Some of these prior systems were disadvantageous in that they resulted in the migration of catalyst-dust particles into the engine chambers and interfered with the efficient operation thereof; moreover, most of these arrangements limited the supply of secondary air and thereby decreased ability of the system to reform and oxidize the impurities present in the exhaust gases. Other systems using catalysts were frequently characterized by a high pressure drop across the catalyst-chamber and/or by a migration of the catalyst particles within the chamber under the high velocity and pressure of the exhaust-gas stream. The latter result was accompanied by the formation of cavities and plenums within the catalyst mass in which no oxidation or combustion of the impurities was effected. Thus the catalyst efficiency and ability of the system to remove effectively the detrimental impurities of the exhaust gas were relatively low. On the one hand, a tightly packed chamber restricts the throughflow rate and decreases the engine efficiency because of back pressure, while, on the other hand, loosely packed chambers are characterized by migration and cavity formation which reduces the degree of purification. When solid catalyst masses are employed to preclude such migration and yet ensure an optimum throughflow of the exhaust gases, condensation deposits, entrained dust particles

2 or the like block the pores of the solid bodies and, in time, render the catalyst useless.

It is, therefore, the principal object of the present invention to provide an improved catalyst body for the catalytic oxidation of incompletely burnt components of an exhaust-gas stream whereby the difficulties enumerated above can be avoided.

A further object of this invention is to provide an improved method of making a catalyst body for the reformation of the exhaust gases of internal-combustion engines whereby the costs of the body can be reduced and an effective throughput obtained with a minimum of cavitation and catalyst migration.

I have found that these objects can be attained when the catalytically effective materials, e.g. solutions or oxides of the catalyst metals, are homogeneously combined with a refractory support material (e.g. kaoline, clay) in a mill. The mixture is combined with hot solutions so that a damp plastic catalyst mass is obtained which, according to this invention, is doctored into or applied to the interstices of a support mesh, preferably a fabric with a mesh separation of 2 mm. and a strand thickness of 1 mm. Thereafter, the paste is pressed into the interstices of the support fabric and, after drying and forming to the configuration of the desired catalyst body, is heated to a temperature sufficient to destroy and gasify the web or fabric (e.g. by combustion). Thus, in accordance with the principles of this invention, the method comprises the steps of forming a paste with a catalyst substance and a refractory catalyst support, applying the paste to the interstices of a thermally destructible support, shaping the body consisting of this support and the phase therein, and thereafter thermally removing the fabric support to form a porous mass.

According to a more specific feature of this invention, the solution added to the refractory material is at a temperature of 80° to 100° C., while the subsequent removal of the fabric is carried out at a temperature of 800° to 1000° C. The fabric can be volatile at this temperature and thus evaporatable upon heating, or may be liquifiable so that it can be melted out of the body. In general, however, combustible fabrics will be employed, such fabrics as leave no residue being preferred.

The resulting catalyst body thus consists of a mass of refractory material homogeneously intercollated with the catalyst material and penetrated by uniform and mutually interlacing capillaries in the places formerly occupied by the fabric threads or wires. I have found that considerable advantage is gained by the use of a fabric, since it gives rise to capillaries extending transversely to the main direction of movement of the exhaust gases to be passed therethrough as well as capillaries parallel to this direction. The capillaries are flushed, preferably during removal of the fabric, with compressed air to remove soot, detritus and dust-like residues. The diameters of the capillaries are selected simply by properly choosing the gauge of the threads or wires and, since such threads or wires are highly uniform, the capillary cross sections are similarly uniform.

I have found, moreover, that considerable advantage can be gained from orienting the threads of the fabric at acute angles to the longitudinal dimensions of the catalyst body. In that case, the passages no longer permit a direct flow of gases from the inlet to the outlet of the catalyst chamber, but ensure a tortuous path so that the dwell time or catalyst-contact time of the gases is sharply increased.

It has been found that the resulting catalyst body is highly stable and resistent to frictional abrasion and can have substantially any shape. The dwell or catalyst time can be adjusted by varying the angle of inclination of the thread, prior to removal of the fabric from the ceramic-catalyst body, while the mesh-size, thread-guage type, or weave can be selected in accordance with the desired throughput and pressure drop across the catalyst body. Furthermore, the flow cross-section of the body is of such a nature, because of the capillary construction of the channel, that excellent utilization of the exposed catalyst surface is obtainable, while the capillaries can be present in practically any desired number and have any advantageous configuration. Similar results cannot be obtained by machining the catalyst body or, as far as I am aware, by any other known mechanical method. The body is resistant to high gas-flow velocities and pressures and retains its structural integrity and its ability to catalyst oxidation reformation of the exhaust gas within wide pressure and slow cross-section ranges. The system has been found, as a consequence of its high flow cross-section and the relative propulsion of free space present within the interior of the body, to have a minimal pressure drop and tendency toward blockage by sedimented particles, thereby being particularly suitable for introduction of secondary air from compressors and load-pressure blowers. Another advantage of considerable significance is the fine distribution of the exhaust stream through and over the entire catalyst body, again ensuring a high degree of oxidation and excellent oxidation efficiency. Furthermore, the catalyst body can be provided with the catalytically effective materials in localized regions adjacent the capillaries or therewithin with ease. In accordance with this aspect of the invention, the fabric is composed of a bibulous fiber or filament which is impregnated with a solution of the catalyst salts, the reractory material being then packed into the interstices of the fabric. The destruction of the fabric thus leaves catalyst material within the capillary channel and along the walls thereof.

The catalyst bodies produced in accordance with the present invention are most advantageously of cylindrical configuration so that they can be inserted into temperature-resistant sleeves or combustion chambers and held there against shifting movement and creep in all directions. It has been found to be more desirable to make the cylindrical body somewhat tubular so that the gas stream undergoing reformation flows from the interior of the body toward the exterior thereof. The chambers and catalysts may be disposed directly in the exhaust lines of an internal combustion engine or in combustion chambers.

The preferred construction of the combustion chamber is described and claimed in my concurrently filed copending application Ser. No. 590,931. In such a system, an ignition device, controlled electronically, is provided for reaction of a portion of the exhaust gas/air mixture for the deflaming and regeneration of the catalyst. The ignition device permits heavy hydrocarbons to be broken down and substantially complete oxidation in the catalyst body of the major part of the carbon-containing constituents of the gas mixture. Furthermore, the system ensures the regeneration of the catalyst and its operation at temperatures of about 500°–900° C. In accordance with the present invention, therefore, a heating element is embedded in the catalyst body to raise the temperature thereof to this level. Furthermore, the catalyst can be so positioned and the combustion chamber so formed that the heat of the engine exhaust gas promotes the oxidation reaction and preheats the secondary air. Moreover, a filter body is provided to prevent blockage by dust and other contaminants whereby the secondary air can be introduced from a relatively small blower. The high ignition and oxidation temperature of this system is additionally employed to transmit heat to the combustion chamber, the inlet and outlet ducts and the secondary-air supply line so that the entire reaction can be continued using only the self-generated heat of the exothermic reaction. Precipitation of combustible components is thereby precluded and, because of the catalyst efficiency, further carbon monoxide is not produced.

I have also found it to be highly advantageous when the catalyst consists, in addition to aluminum and/or magnesium silicate support substances (derived from talcum, meerschaum, clay or kaoline), of sufficient catalyst compounds such that elemental cobalt is present in an amount between 8–20% by weight, elemental manganese is present in an amount of 6–20% by weight, elemental copper is present in an amount of 1–10% by weight and platinum and palladium are present in an amount of 0.05–5% by weight. The catalyst body is found to be unaffected by lead and sulfur compounds normally present in exhaust gas mixtures and oxidizes substantially all of the hydrocarbons, hydrogen and carbon monoxide to water vapor and carbon dioxide.

The above and other objects, features and advantages of the present invention will become more readily apparent from the following description, reference being made to the accompanying drawing in which:

FIG. 1 is a diagram, in elevational cross-section, of an apparatus for processing the catalyst bodies in accordance with this invention and illustrating some of the steps involved therein:

FIG. 2 is a perspective view of the catalyst body produced by this method;

FIG. 3A and FIG. 3B are longitudinal cross-sections through catalyst bodies in which some of the capillary channels extend in the longitudinal dimension and in which the capillary channels are inclined to the longitudinal dimension, respectively;

FIG. 8 is an elevational view of a sintered quartz tube in accordance with the principles of this invention;

FIG. 9 is an end view thereof;

FIG. 10 is an elevational view of a U-shaped quartz tube partly broken away;

FIG. 11 is a plate-like catalyst body, according to this invention having a heating wire;

FIG. 14 is a greatly enlarged section of the capillary channels of such a body.

Figure 4:
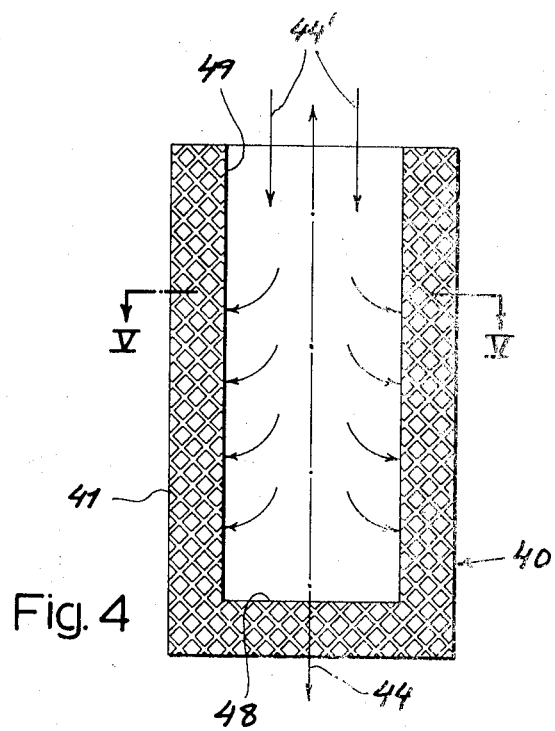
FIG. 4 is an axial cross-sectional view through a hollow cylindrical catalyst body in accordance with this invention.

In FIG. 1, I show a nozzle 10 from which a catalyst mass 11 (e.g. damp elastically moldable mixture of a catalyst component and a refractory clay) is extruded onto a fabric band 12 consisting of woven wire mesh of low-melting point or a textile fiber, the fabric band 12 being conducted over a support plate 13 via an idler roller 14 from a supply coil 15. A pressure roller 16 just forwardly of the mouth of the nozzle 10 compresses the extruded strand 11 of the refractory catalyst mass into the interstices 17 of the fabric so that the fabric is fully embedded in the mass as it emerges at 18 from beneath the pressure roller 16. At a takeup means, the band is coiled tightly into a cylindrical body 19 whereby the faces of successive turns of the band are pressed together and merged. It will be understood that it is also possible to stack the successive layers of the refractory-encased fabric after cutting them into rectangular or cylinder sections so that the juxtaposed faces of the band merge together and a three-dimensional solid body is formed with many layers of fabric closely spaced from one another and substantially completely embedded therein. The intermediate mass can be of any desired configuration (e.g. cylindrical, prismatic, cubic). After laminating the layers of the band together, I subject the three-dimensional body to a heat-treatment at a temperature of about 800° to 1000° C. and sufficient to melt out the fabric and bake the refractory or to vaporize or burn out the fabric while firing the body. The firing can be carried out with the continuous subjection of the body to a stream of compressed air or high velocity or from a blower so that all residues are swept from the body. When, in addition to, or in place of, the distribution of catalysts in the solid mass, it is desired to coat the capillary channels left by the destruction of the fabric or deposit catalysts therein, I make use of a bibulous-fiber fabric which is impregnated with a catalyst solution, permitted to dry, or used in the moist state, the fabric being then embedded in the refractory material. Firing of the body destroys the organic parts of the fabric leaving residues of catalysts in the channels.

A rectangular parallelepipedal block of the catalyst material is shown in FIG. 2. The block 20 comprises a mass 21 of a blocked refractory substance containing a plurality of layers 22 in stacked relationship of capillary channels; these layers each being formed by a respective layer of fabric destroyed in situ in the manner described above. The longitudinal channels 23 open at the end faces 24 (only one shown) of the catalyst block and serve for introduction and removal of the exhaust gases. The transverse channels 25, at right angles to the longitudinal dimension 26 of the catalyst body and to the longitudinal extension channel 23, are closed off at the lateral flanks 27 of the catalyst body. In FIG. 3A, I show a horizontal section through the block 20 of FIG. 2 and it can be said that the longitudinal channels 23 extend over the full length of the body while the transverse channels 25 are blocked at their ends. Between the intersecting set of channels there are rectangular webs 28 which are sectioned through in FIG. 3A, although not hatched to facilitate understanding.

It will be understood that gas introduced at one end 24 and emerging at the other end 24' will not pass directly through the device but will, as a consequence of the tendency of the fluid to spread outwardly, permeate the entire body 21 and have a dwell time which can be controlled by varying the diameter of the capillary channels, the closeness of the channel spacing, and the orientation of the channels. The effect of orientation will be more readily apparent from FIG. 3B in which I show a section, similar to FIG. 3A through another catalyst body. This catalyst body 30 has ends 34 and 34' at which the gases are introduced and removed. Here the fabric used in preparing the body runs at angles $\alpha$ to the longitudinal dimension 36 of the body so that channels 33 and 35, mutually octagonal but inclined at angles $\alpha$ to the longitudinal dimension 36, are formed. The gas passing through these channels thus proceeds along a zigzag path and has a higher dwell time and catalyst contact time than in the system of FIG. 2.

Figure 5:
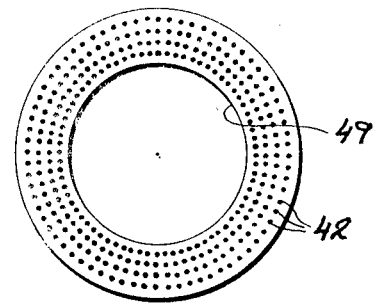
FIG. 5 is a cross-section taken along the line V—V of FIG. 4.

In the arrangement of FIGS. 4 and 5, I have formed the body, having fabric threads extending at angles to the axial longitudinal direction (44), into a cup-like cylinder 40. The cylindrical catalyst body 40 has a wall 41 made of a plurality of generally coaxial layers 42 of capillary channels, each formed in situ by destruction of a corresponding fabric. The channels 42 are interlaced as shown in FIG. 4 and surround a cylindrical free space 49 above the bottom wall 48 of the catalyst body. In this case, it is preferred to introduce the gases to be reformed generally axially (arrows 44') and permit the gases with or without secondary air to pass readily outwardly through the wall 41 of the catalyst body; the catalyst body may also be formed from plates or rings in which the fabric is embedded.

The cylindrical or rectangular bodies of FIGS. 1 to 5, consisting of catalyst masses through which capillary channels run in a fabric-like pattern are preferably used in a catalyst chamber and system of the type described and claimed in my copending application Ser. No. 590,931, filed concurrently herewith.

Figure 12:
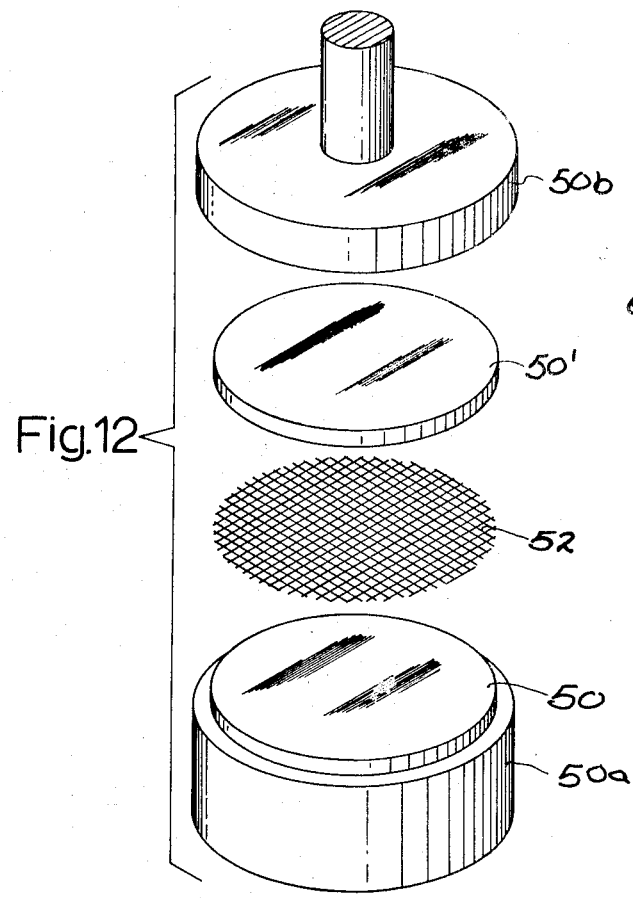
FIGS. 12 and 13 are diagrammatic views illustrating other methods of making the catalyst body.
Figure 13:
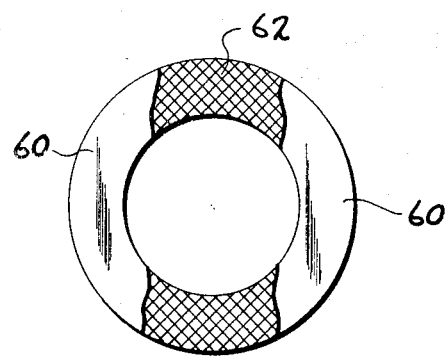

In FIG. 12, I show a system whereby the catalyst body is formed from layers 50 of the plastic catalyst mass having a thickness of 2 to 3 mm. and which, in a round press represented by an anvil 50a and a plunger 50b, are overlain by respective fabric disks 52 upon which a successive disk-shaped layer 50' of the catalyst mass is applied. The webs 52 of fabrics and layers 50, 50' alternate in the stack until the desired height thereof is obtained and then the press closed. In FIG. 13, I show the construction of the catalyst bodies when the plastically reformable layers 60 and 60' are alternated with annular fabric layers 62 to form catalyst rings. The stacks and rings illustrated and described with reference to FIGS. 12 and 13 can have heights (i.e. axial thicknesses) of 45 mm. and diameters of 85 mm. for optimum packing in the catalyst chamber. Of course, the fabric is burned out of the rings or stacks prior to such use to ensure the presence of capillary channels in the individual catalyst bodies.

Figure 6:
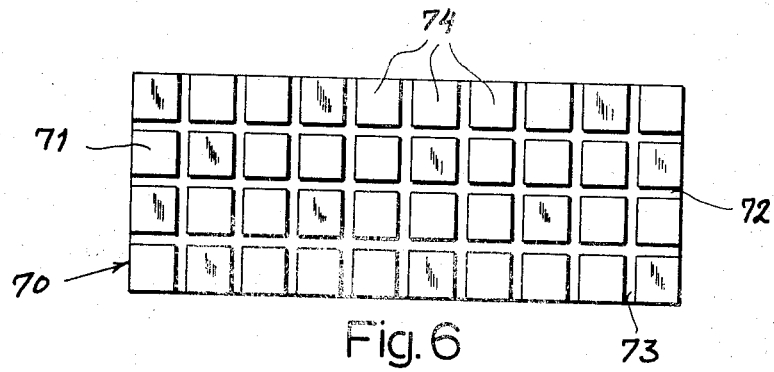
FIG. 6 is a bottom-plan view of the catalyst body having rectangular ignition lands separated by capillary channels.
Figure 7:
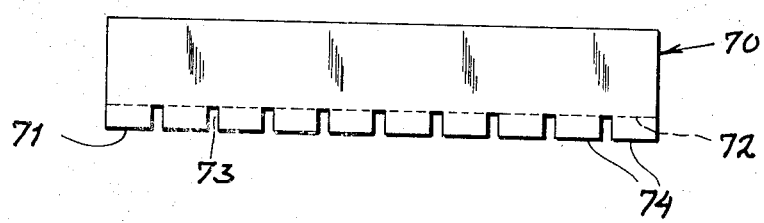
FIG. 7 is a side elevational view of the body of FIG. 6.

The disks, plates and blocks of catalyst material, in accordance with the present invention, are advantageously provided upon their underside with mutually orthogonal arrays of parallel grooves (FIGS. 6 and 7) so that the gases can pass along the underside of such bodies. In FIGS. 6 and 7, I show such a body 70 whose capillary channels are the type illustrated and described in connection with FIGS. 2, 3a and 3b, and which is provided at its underside 71 with longitudinal extending channels 72 and transverse channels 73 of two octagonal interconnected arrays. The grooves 72 and 73 thus form square fields or lands 74 between them. This subdivision of the underside of the blocks, using grooves having a depth of 3 to 4 mm., can apply to any other surface (top or side) of the body as well. The large number of lands 74 affords a substantial improvement in the starting and ignition threshold of the combustion arrangement, especially when a system of the type described in my copending application identified earlier is used. Furthermore, the deflaming of the exhaust gas/air mixture is ensured because oxidation commences at temperatures as low as 150° to 200° C. without the deposition of condensate or soot.

Figure 7A:
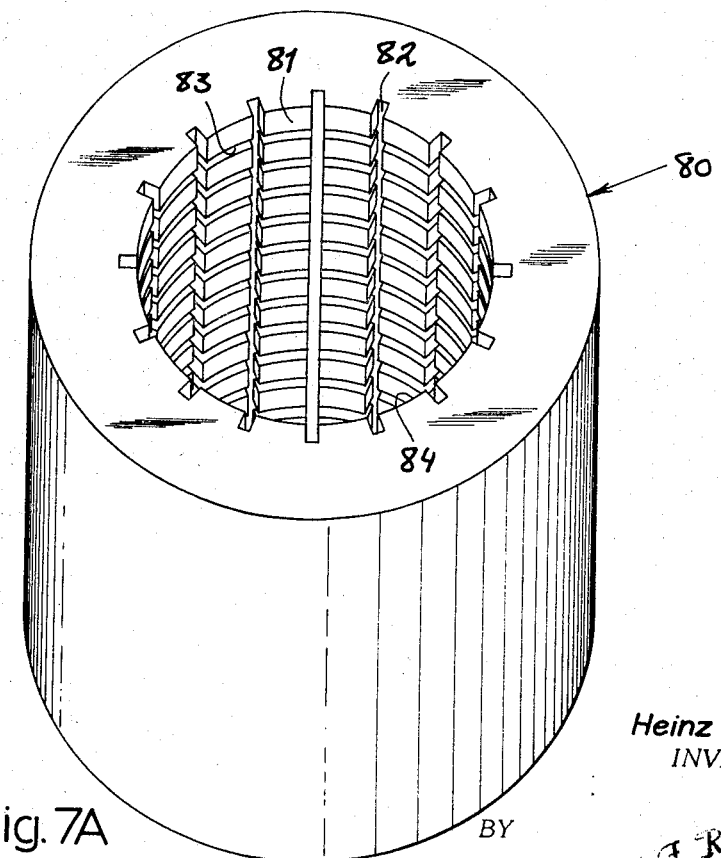
FIG. 7A is a perspective view of another embodiment.

When the body 80 is of cylindrical configuration as illustrated in FIG. 7A, the longitudinal grooves 82 and the transverse grooves 83 are formed along the interior surface 81 thereof.

The intersecting grooves 82, 83 thus form lands 84 which act as combustion-initiating and deflaming fields exposed to a gas/air mixture with such increased surface areas that the commencement of the reformation reaction begins. The efficiency of the catalyst combination of the gas and oxygen upon these surfaces can be improved according to this invention, when a solution of a palladium salt (equivalent to 0.5 to 1% by weight of palladium), reinforced with a platinum salt (0.05% by weight of platinum) is impregnated into these lands 74, 84 at a solution temperature of 90° C. The lands are flamed at a temperature of about 600° C., whereby the acid components of the palladium/platinum are lost and the noble metal oxide penetrates the lands to a depth of 3 to 5 mm. It has been found that, after a treatment of this character, an oxidation of the exhaust gases commences when the temperature of the gas mixture or the catalyst reaches 100° to 125° C. and the resulting exothermic reaction generates sufficient heat to maintain this reaction temperature for as long as the gas/air mixture continues to be supplied to the catalyst.

In FIG. 8, I show a tube 90 sintered from quartz glass and provided with cutouts 91 at axially staggered locations therealong.

Openings 92 are provided axially through the tube (FIGS. 8 and 9) and receive a heating wire 93 (e.g. of nichrome or the like), preferably of U-configuration so that the ends of the wire 94 (one shown) emerge at an extremity of the tube 90 for connection to respective terminals. The quartz tube 90 can be embedded in the catalyst mass (FIGS. 1–7, 7a, 12 and 13) and the wires 93 connected to the battery of the automotive vehicle so that the heat generated thereby emerges in part by convection from contact with the tube and radiation therefrom. It has been found that such heating means improves the commencement of the gas-reformation reaction and, consequently, lowers the temperature level at which the removal and reformation of noxious components and the exhaust gas of the vehicle begins.

In FIG. 10, I show another heating arrangement for incorporation into the solid catalyst body or adapted to be surrounded by a multiplicity of such bodies in a catalyst chamber of the type disclosed and claimed in my above-identified copending application. This tube 100 is bent in a U- or C-configuration and is composed of sintered quartz glass. A heating wire 103 passes through the tube but has its ends 104 and 104' emerging therefrom. The infrared heating radiation from either type of tube (FIGS. 8 and 9 or FIG. 10) is effective at least in part because of its drying action upon the exhaust gas/air mixture, which drying permits an objectionable oxidation of the oxidable components to be carried out. Upon obtainment of a predetermined temperature, for example between 600° and 700° C., the heating wires 93 and 103 can be electronically de-energized so that the exothermic oxidation reaction will maintain itself.

An ignition plate 110 is illustrated in FIG. 11 and is there shown to be provided with capillary channels 119 formed in the manner previously described. The ignition plate 110 is provided with a central opeing 112 into which a heating element 113 is inserted. The heating element 113 incldes a heating wire (e.g. 93 or 103) surrounded by a quartz-glass tubular sheet (e.g. 90 or 100) of the type illustrated in FIGS. 8 and 9.

The operation of the catalyst system of FIG. 10, is commenced by connecting the heating element 113 in an electrical circuit and thereby raising the temperature of the infrared heater to a glowing level. This operation proceeds rapidly and the heating element is thus rapidly at the ignition temperature of the exhaust gas/air mixture. The ignition plate 110 is thereby brought to a temperature of up to 1000° C. which temperature is maintained by the self-sustaining flame-free oxidation reaction occurring along the oxidation-starting lands (e.g. those shown at 74 in FIGS. 6 and 7). This temperature is maintained even when the electric current is shut off. It has been found that the embedding of the heater wires in the quartz tubes (90, 100) ensure that they will not be subjected to corrosion during operation of this system.

In FIG. 14, I show in greatly enlarged scale, the capillary channels of a catalyst body produced in accordance with an important feature of this invention. Here, the body 120 has longitudinal channels 123 and transverse channels 124 in the manner previously described with reference to FIGS. 1–5, 12 and 13, although the walls of the capillaries are ribbed at 123' and 124' in a generally helical manner. These ribs are formed by using a fabric (e.g. a cotton weave) whose threads are twisted so that crevices are formed between and along the twisted strand of these threads. The catalyst/clay mixture penetrates in part into these twist crevices and, upon destruction of the fabric, forms the helical ridges illustrated. It has been found that these ridges impart a vortex flow and twist to the gas mixture as it passes there along and increases both dwell time and catalyst efficiency.

EXAMPLE

A catalyst body as shown in FIGS. 1–7 and 12–14 is formed by initially mixing kaoline or clay in a ball mill with a solution of the hydroxides, oxides or carbonates of cobalt, manganese, copper and platinum, such that 8–20% by weight of elemental cobalt, 6–20% elemental manganese, 1–10% elemental copper and 0.05–5% elemental platinum and/or palladium are present in the catalyst together with aluminum or magnesium silicate derived from the clay or kaoline. A moldable plastic mass with the catalyst substance finely divided therein is thus formed, the catalyst solution being at a temperature of 80–100° C. upon its admixture with the dry clay or kaoline. The fabric has a mesh size of 2 mm. and a thread thickness of 1 mm. and is composed of cotton, each of the threads being twisted from two or more strands. The clay mixture is pressed into layers of the fabric with the resulting thicknesses being stacked and pressed together as described with reference to FIG. 1 or FIGS. 12 and 13. When the body is shaped to size, it is placed in a kiln and heated to a temperature of at least 800° C. but less than 1000° C. while air is blown through the channels formed by combustion of the fabric. The fabric, prior to being embedded in the body, is immersed in an aqueous solution of the catalyst so that additional catalyst residue is deposited in the channels and along the walls. Upon conclusion of the firing step, the body is found to be rigid and wear-resistant with the catalyst present in the oxide form as a result of the evolution of moisture and carbon dioxide from the catalyst components. The bottom of the body was shaped as described in connection with FIGS. 6 and 7, by cutting channels of a depth of 3–4 mm. therein with a spacing of 10–20 mm., the bottom surface and lands being treated after the firing of the body with an aqueous solution containing palladium and platinum salts equivalent to 0.5–1% by weight elemental palladium and 0.05% by weight elemental platinum at a solution temperature of 90° C. The lands are treated with a flame from a Bunsen burner or torch at a temperature of 600° C. until the additional catalyst is found to penetrate the lands 74 to a depth of 3–5 mm. The ignition and deflaming lamp produce an initial catalyst oxidation of the exhaust gas/air mixture at a temperature of 100–125° C. In the manner illustrated in FIG. 11, a heating wire 93 or 103 embedded in a thin-wall quartz-glass sintered tube is placed in the plastic body before firing and generally it raises the catalyst body to a temperature of 600°–700° C. immediately upon starting of the automobile. Analysis of the emergent gases shows that practically all of the carbonation material is in the form of carbon dioxide and that the emerging gases consist substantially entirely of carbon dioxide, water vapor, nitrogen and oxygen.

I claim:
1. A method of making an elongated catalyst body for the oxidation of oxidizable components of an exhaust gas stream, comprising the steps of:
   (a) embedding a fabric mesh of thermally destructible material with a mesh size of approximately 2 mm. and a thread thickness of approximately 1 mm. in a plastic ceramic mass penetrating the interstices of said fabric, said fabric mesh being composed of mutually orthogonal arrays of threads with one of said arrays extending in the general direction of the major dimension of said body and said fabric running substantially the full length of said body;
   (b) shaping the ceramic mass surrounding said fabric to a predetermined configuration;
   (c) firing said ceramic mass to bake the latter into a coherent rigid body while destroying the embedded fabric in situ to form capillary channels within the resulting rigid body in regions where the threads of said fabric are destroyed and completely eliminating the threads and any residue thereof from the channel, said channel being composed of bibulous threads; and
   (d) impregnating into said fabric an energetic catalyst substance containing 8 to 20% by weight cobalt, 6 to 20% by weight manganese, 1 to 10% by weight copper and 0.05 to 5% by weight platinum and/or palladium, said catalyst substance remaining in said capillary channels upon the thermal destruction of said fabric.

2. The method defined in claim 1 wherein both said arrays of threads extend at angles to the direction of the major dimension of said body.

3. The method defined in claim 1 wherein said fabric is composed of threads each of which is twisted from a plurality of strands whereby the ceramic mass penetrates into the grooves between the twisted strands to form generally helical ridges in said capillary channels.

4. The method defined in claim 1 further comprising the step of directing a stream of air against the body during the firing thereof to sweep said channels clear of residue upon the destruction of said fabric.

5. A method of making an elongated catalyst body for the oxidation of oxidizable components of an exhaust-gas stream, comprising the steps of:
 (a) embedding a fabric mesh of thermally destructible material with a mesh size of approximately 2 mm. and a thread thickness of approximately 1 mm. in a plastic ceramic mass penetrating the interstices of said fabric, said fabric mesh being composed of mutually orthogonal arrays of threads with one of said arrays extending in the general direction of the major dimension of said body and said fabric running substantially the full length of said body;
 (b) shaping the ceramic mass surrounding said fabric to a predetermined elongate configuration;
 (c) firing said ceramic mass to bake the latter into a coherent rigid body while destroying the embedded fabric in situ to form capillary channels within the resulting rigid body in regions where the threads of said fabric are destroyed and completely eliminating the threads and any residue thereof from the channel;
 (d) forming at least one face of said body with a multiplicity of intersecting grooves defining oxidation-initiating lands between them; and
 (e) applying a catalyst substance containing 8 to 20% by weight cobalt, 6 to 20% by weight manganese, 1 to 10% by weight copper and 0.05 to 5% by weight platinum and/or palladium to said lands.

6. A method of making a catalyst body for the oxidation of oxidizable components of an exhaust-gas stream comprising the steps of:
 (a) embedding a fabric of thermally destructible material in a plastic ceramic mass penetrating the interstices of said fabric;
 (b) shaping the ceramic mass surrounding said fabric to a predetermined configuration;
 (c) firing said ceramic mass to bake the latter into a coherent rigid body while destroying the embedded fabric in situ to form capillary channels within the resulting rigid body in regions where the threads of said fabric are destroyed; and
 (d) embedding an electric heating element in said body for initially raising same to a temperature sufficient to induce catalytic oxidation of the exhaust gas.

7. A method of making an elongated catalyst body for the oxidation of oxidizable components of the exhaust-gas stream of an internal combustion engine, comprising the steps of:
 (a) embedding a fabric mesh of thermally destructible material with a mesh size of approximately 2 mm. and a thread thickness of approximately 1 mm. in a plastic ceramic mass penetrating the interstices of said fabric, said fabric mesh being composed of mutually orthogonal arrays of threads with one of said arrays extending in the general direction of the major dimension of said body and said fabric running substantially the full length of said body;
 (b) shaping the ceramic mass surrounding said fabric to a predetermined elongate configuration;
 (c) firing said ceramic mass to bake the latter into a coherent rigid body while destroying the embedded fabric in situ to form capillary channels within the resulting rigid body in regions where the threads of said fabric are destroyed and completely eliminating the threads and any residue thereof from the channel, said body consisting at least in part of a catalytic support selected from the group of aluminum silicate and containing an amount of at least one catalyst substance selected from the group which consists of 8 to 20% by weight cobalt, 6 to 20% by weight manganese, 1 to 10% by weight copper, and 0.05 to 5% by weight platinum and/or palladium.

8. The method defined in claim 7 wherein said support constitutes said mass and is mixed homogeneously with said catalyst substance prior to embedding said fabric therein and is fired at a temperature ranging between substantially 500° to 1000° C., said fabric being embedded in a multiplicity of layers in said ceramic mass and having mutually orthogonal arrays of threads.

9. A method of making a catalyst body for the oxidation of oxidizable components of an exhaust gas stream of an internal combustion engine, comprising the steps of: forming a damp plastically shapable ceramic mass by admixing an oxidation-promoting catalyst with a ceramic, said catalyst containing 8 to 20% by weight cobalt, 6 to 20% by weight manganese, 1 to 10% by weight copper and 0.05 to 5% by weight platinum and/or palladium, embedding a fabric mesh of thermally destructible combustible material in said plastic ceramic mass whereby said mass penetrates the interstices of said fabric, said fabric mesh being composed of mutually orthogonal arrays of threads with one of said arrays extending in the general direction of the major dimension of said body and said fabric running substantially the full length of said body, said fabric having a mesh size of approximately 2 mm. and a thread thickness of approximately 1 mm.; shaping the ceramic mass surrounding said fabric to a predetermined configuration; drying said mass; and firing said ceramic mass at a temperature between 500° and 1000° C. and sufficient to bake said ceramic mass into a coherent rigid body while destroying the embedded fabric in situ by combustion to form capillary channels within the resulting rigid body in regions where the threads of said fabric are destroyed.

10. An elongated catalyst body for the catalytic oxidation of exhaust gases of an internal combustion engine, comprising a rigid ceramic mass formed internally with a plurality of mutually parallel sets of mutually orthogonal and intersecting arrays of linearly extending capillary channels running the full length of said body, and a catalyst substance deposited along said channels and containing 8 to 20% by weight cobalt, 6 to 20% by weight manganese; 1 to 10% by weight copper and 0.05 to 5% by weight platinum and/or palladium.

11. A catalyst body as defined in claim 10 and having at least one face provided with intersecting grooves defining oxidation-initiating lands exposed to said gases, said lands being impregnated with said catalyst substance containing 8 to 20% by weight cobalt, 6 to 20% by weight manganese, 1 to 10% by weight copper and 0.05 to 5% by weight platinum and/or palladium.

12. A catalyst body as defined in claim 11 wherein said lands have a depth of 3 to 4 mm., said channels have a spacing of about 2 mm. and diameters of about 1 mm.

13. A catalyst body for the catalytic oxidation of exhaust gases of an internal combustion engine as defined in claim 11, further comprising an electric heating element embedded in said mass.

14. A body as defined in claim 13 wherein said electric heating element includes a resistance-heating wire encased in a quartz-glass tubular sheath.

15. A body as defined in claim 14 wherein said sheath is provided with openings through which the remainder of said body is heated by said wire.

16. A body as defined in claim 13 wherein the walls of said capillary channels are formed with helical ridges.

References Cited

UNITED STATES PATENTS

| | | |
|---|---|---|
| 2,474,201 | 6/1949 | Raymond et al. |
| 2,506,244 | 5/1950 | Stopka. |
| 3,162,607 | 12/1964 | Burbidge et al. _ _ _ _ _ _ 252—477 |
| 3,441,381 | 4/1969 | Keith et al. |

FOREIGN PATENTS 531,112  12/1940  Great Britain.

JAMES H. TAYMAN, Jr., Primary Examiner

U.S. Cl. X.R.

264—44, 59; 252—477, 422, 471; 219—381, 553; 106—41